W. H. HAMMOND.
WEEDING HOE.
APPLICATION FILED AUG. 7, 1915.
1,186,657.
Patented June 13, 1916.
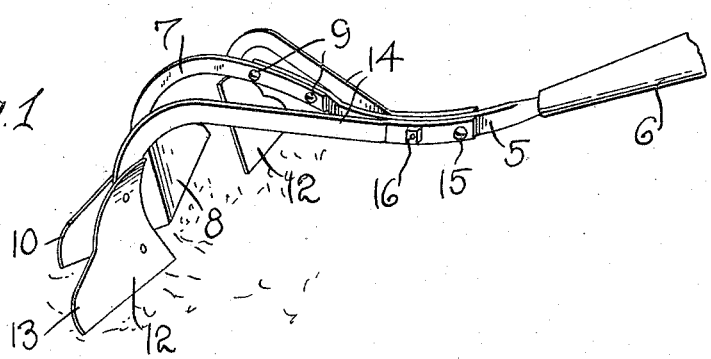
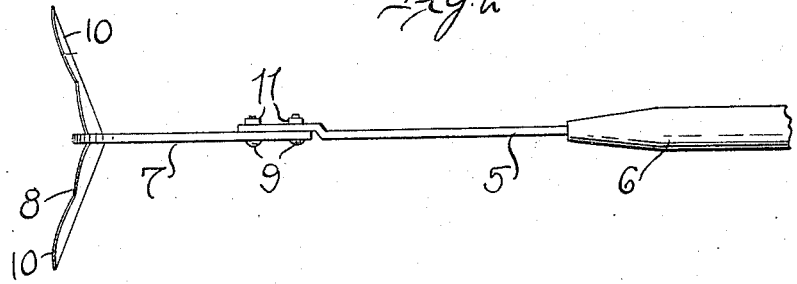
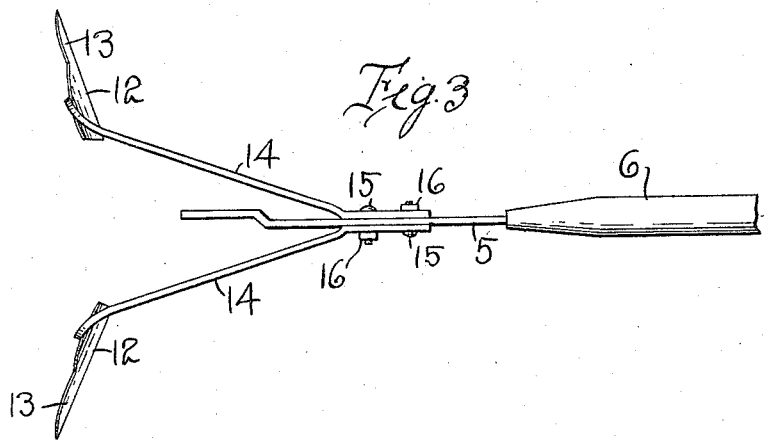
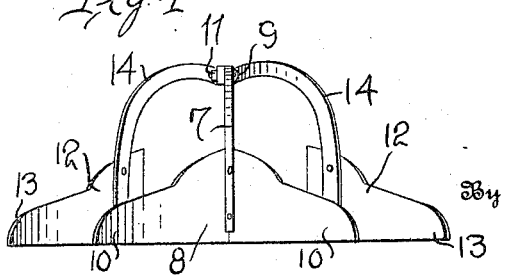
Inventor
W. H. HAMMOND
By Watson E. Coleman
Attorney

UNITED STATES PATENT OFFICE.

WILLIAM H. HAMMOND, OF CLIFFORD, MASSACHUSETTS.

WEEDING-HOE.

1,186,657.   Specification of Letters Patent.   Patented June 13, 1916.

Application filed August 7, 1915. Serial No. 44,241.

*To all whom it may concern:*

Be it known that I, WILLIAM H. HAMMOND, a citizen of the United States, residing at Clifford, in the county of Bristol and State of Massachusetts, have invented certain new and useful Improvements in Weeding-Hoes, of which the following is a specification, reference being had to the accompanying drawings.

This invention relates to an improved weeding hoe and has for its primary object to provide a device of this character which may be used for a variety of purposes and under different circumstances or conditions of plant growth to remove and destroy all weeds.

It is another important object of the invention to provide a multiple hoe which may be wielded with facility and a minimum of manual labor.

The invention has for a further object to provide an implement for the purpose stated, embodying a plurality of hoe members, any one of which may be easily and quickly detached and removed, the device as a whole being exceedingly simple in its construction and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a perspective view of my improved weeding hoe, illustrating the preferred embodiment thereof; Fig. 2 is a plan view showing the hoe in use for weeding between spaced plant rows; Fig. 3 is a similar view showing the hoe employed for weeding upon opposite sides of a single plant row; and Fig. 4 is an end elevation of the device.

Referring in detail to the drawing, 5 designates the main shaft of the implement, to one end of which a handle 6 is attached in any preferred manner. This shank, beyond the handle, is upwardly curved to its extremity and, to the same, the curved shank 7 of a detachable hoe blade 8, is secured by means of the spaced bolts 9. The hoe blade 8 is formed with the wings 10 projecting laterally from opposite sides of the shank and having their upper edges oppositely inclined, as shown. The blades of the hoe gradually decrease in width from the shank to their outer ends. Upon the extremities of the threaded bolts 9, nuts 11 are engaged whereby the shank 7 and the main shank 5 may be tightly clamped together and held against relative movement.

In conjunction with the central hoe blade 8, I employ a pair of side hoe blades 12, each of which is formed with a relatively narrow, laterally extending wing 13. The wider inner ends of these blades are secured upon the curved ends of the shanks 14 which are adapted to be detachably secured to the main shank 5 inwardly of the central detachable shank 7 by means of the bolts 15, said bolts having nuts 16 threaded upon their ends, whereby the shanks are securely held in assembled relation. Each of the shanks 5, 7 and 14 is preferably of rectangular cross-sectional form so that a maximum of strength is obtained with the use of a minimum amount of metal. The hoe blades 8 and 12 may be secured to the respective shanks by suitable rivets or they may be drop forged or welded upon the shanks, as convenience or economy may dictate.

In the use of my improved multiple weeding hoe, the three hoe blades may be used together, assembled in the manner shown in Fig. 1 of the drawing. If a smaller hoe is desired, one of the side hoes 12 can be removed, or if it is desired to operate upon a smaller area of ground, both of these side hoes may be removed, as might be necessary in weeding the ground between spaced plant rows. Again, when it is desired to weed and cultivate the ground upon opposite sides of a single row, the central hoe blade 8 and its shank are removed, as shown in Fig. 3 of the drawing. This arrangement of the hoes is employed in hoeing and weeding small plants such as parsnips, turnips, onions, etc. The several hoe members may be very easily and quickly removed from the main shank 5 or assembled in operative relation.

From the foregoing description, taken in connection with the accompanying drawing, it is believed that the construction and several advantages of my invention may be clearly and fully understood. The device is of exceedingly simple construction, may be produced at small manufacturing cost, and is highly serviceable and convenient in practical use. The soil will readily pass over the narrow wings of the hoe blades and will not become clogged upon the blade surfaces so that the device may be manipulated with comparatively little manual labor.

While I have shown and described the preferred construction and arrangement of the several parts, it is to be understood that the device is susceptible of considerable modification therein and I, therefore, reserve the privilege of resorting to all such legitimate changes as may be fairly embodied within the spirit and scope of the invention as claimed.

Having thus fully described my invention, what I desire to claim and secure by Letters Patent is:—

The herein described weeding hoe including a main shank, diverging shanks detachably secured by a common fastening means to opposite sides of said main shank intermediate of the ends of the latter, a supplementary shank detachably connected to the end of said main shank and disposed between said diverging shanks, a hoe blade fixed intermediate of its ends upon the extremity of said supplementary shank and having rearwardly diverging wings extending upon opposite sides of said shank, and an outwardly projecting, rearwardly inclined blade fixed upon the extremity of each of said diverging shanks.

In testimony whereof I hereunto affix my signature in the presence of two witnesses.

WILLIAM H. HAMMOND.

Witnesses:
GEORGE W. STETSON,
HELEN N. ANDERSON.